May 30, 1933.     G. E. PARKER     1,912,092
SHOCK ABSORBER
Filed July 11, 1931     2 Sheets-Sheet 2

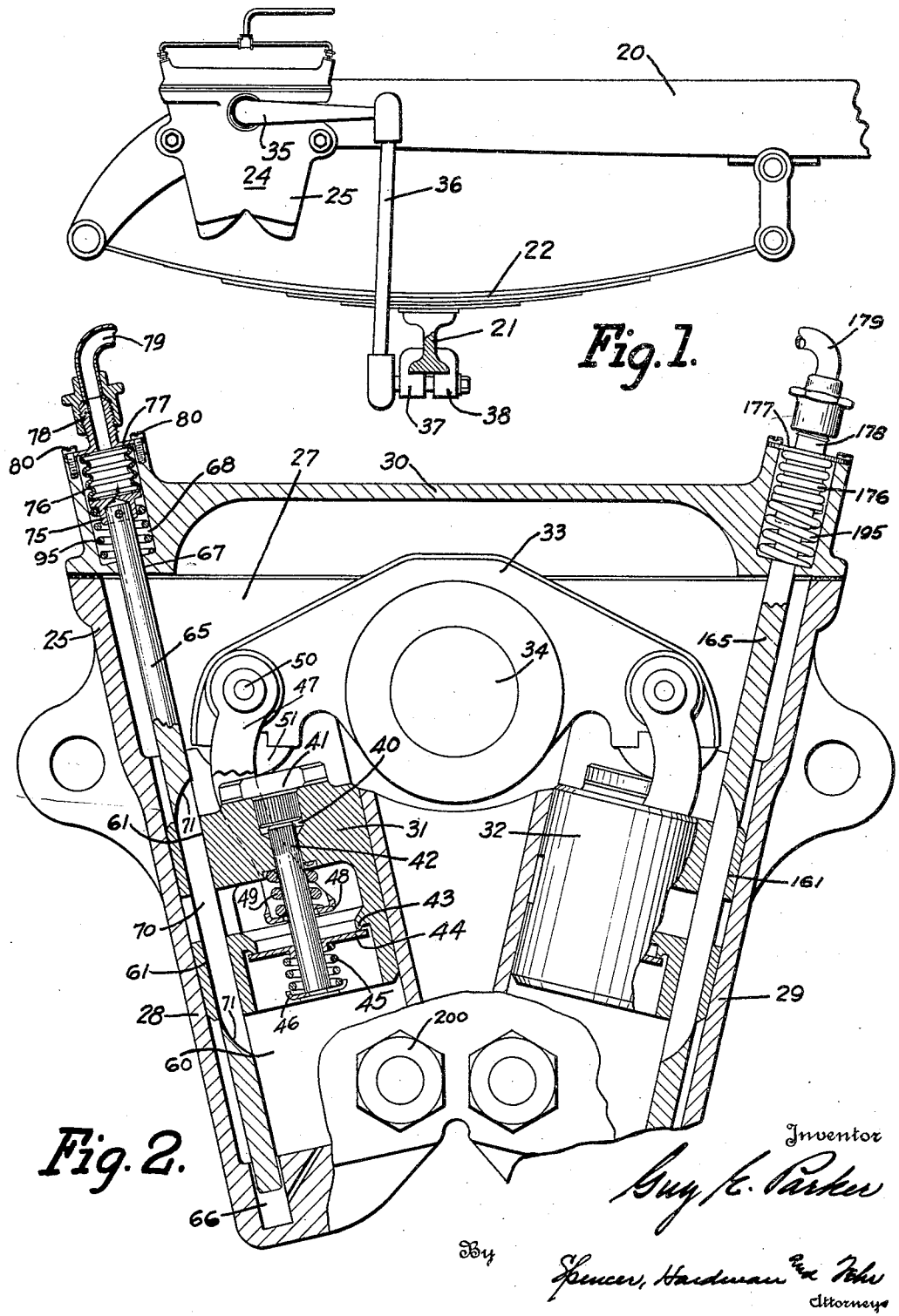

Inventor
Guy E. Parker
By Spencer, Hardman and Fabu
Attorneys

Patented May 30, 1933

1,912,092

UNITED STATES PATENT OFFICE

GUY E. PARKER, OF BIRMINGHAM, MICHIGAN, ASSIGNOR TO DELCO PRODUCTS CORPORATION, OF DAYTON, OHIO, A CORPORATION OF DELAWARE

SHOCK ABSORBER

Application filed July 11, 1931. Serial No. 550,245.

This invention relates to improvements in hydraulic shock absorbers.

It is among the objects of the present invention to provide hydraulic shock absorbers for controlling movements between the frame and axles of a vehicle, said shock absorbers being adjustable from the operator's seat to vary resistance thereof to the movements of said frame and axles.

Further objects and advantages of the present invention will be apparent from the following description, reference being had to the accompanying drawings wherein a preferred embodiment of one form of the present invention is clearly shown.

In the drawings:

Fig. 1 is a fragmentary side view of a vehicle chassis with a shock absorber embodying the present invention applied thereto. The wheels of the vehicle have been omitted for the sake of clearness.

Fig. 2 is a full size vertical sectional view of a shock absorber, certain parts therein being shown in elevation for the sake of clearness.

Figure 3:
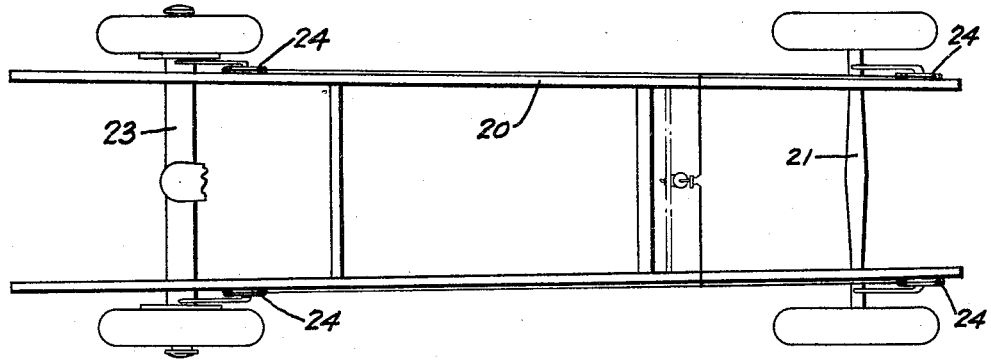
Fig. 3 is a plan view of the vehicle chassis equipped with the present invention.
Figures 4, 5:
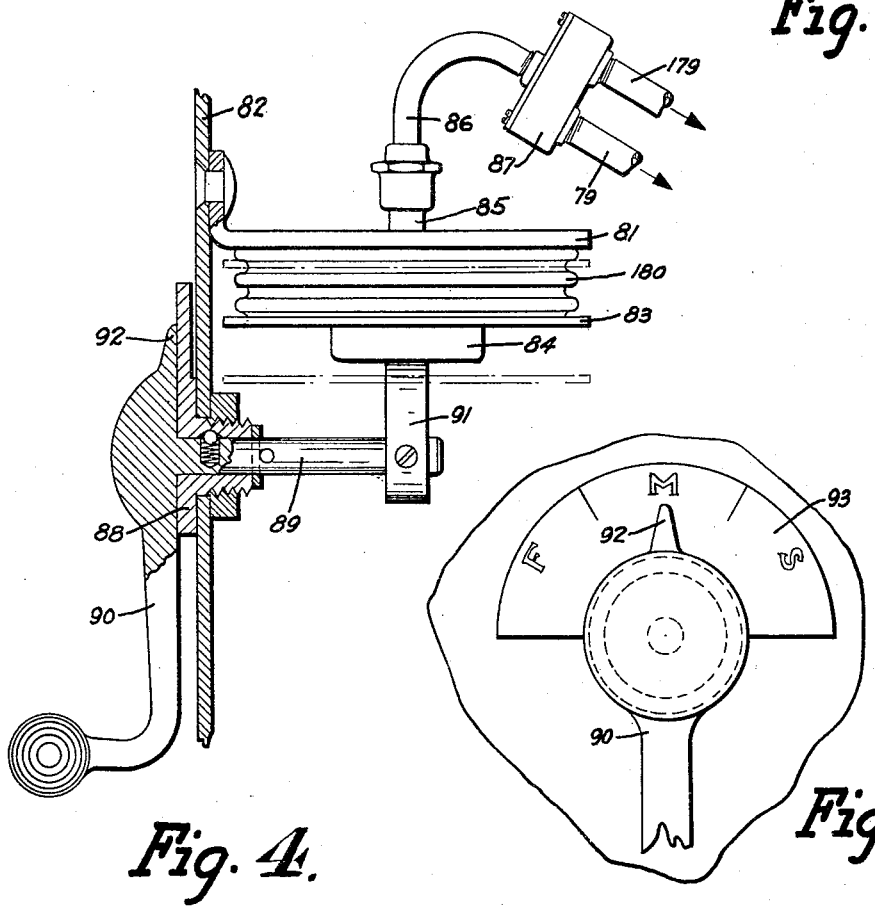
Fig. 4 is a view partly in section and partly in elevation of the hand-operated fluid pressure supply device.
Fig. 5 is a front view of the dial and the hand operated lever which is accessible from the seat of the operator.

Referring to the drawings, the numeral 20 designates the frame of the vehicle, which is supported upon an axle 21 by springs 22, only one of which is shown. The axle 21 is the front axle of the vehicle, the rear axle being designated by the numeral 23 on Fig. 3.

The shock absorbers, designated as a whole by the numeral 24, each comprise a casing 25 presenting a fluid reservoir 27 and two cylinders 28 and 29. A cover 30 attached to the shock absorber casing 25 in any suitable manner, closes and seals the reservoir 27.

In each cylinder there is provided a piston, the one in cylinder 28 being designated by the numeral 31, the piston in the cylinder 29 by the numeral 32. A rocker arm 33 attached to the pistons in a manner to be described, is carried upon a rocker shaft 34 which is journalled in the casing 25 in any suitable manner, one end of said shaft extending outside the casing and having an operating arm 35 provided thereon. The free end of this arm 35 is swivelly attached to one end of a link 36, the other end of said link being swivelly secured to a bracket 37 anchored to the axle 21 by the clamping member 38.

Inasmuch as both pistons 31 and 32 are substantially alike, only one of them will be described for the sake of brevity.

The upper end of the piston is open excepting a transverse central web which extends across the opening, said web having a central opening 40 therein. The shank of the wearpiece 41 fits tightly into the upper end of this central opening, the head portion of this wearpiece resting upon the top surface of the central web portion of the piston head. A pin 42 fits tightly into the lower portion of the opening 40, this pin being substantially coaxial of the skirt of the piston. Substantially midway between the ends of the piston, and in the interior thereof, there is provided an annular flange forming an annular valve seat 43.

The intake valve of the shock absorber designated by the numeral 44, is slidably supported upon the pin 42 and is urged into engagement with the annular valve seat 43 by a spring 45 which is interposed between the valve 44 and a retainer collar 46, secured to the outer end of the pin 42 in any suitable manner. A U-shaped link 47 has arms extending through the openings on each side of the central web portion of the piston head, the web portion 48 of said link, connecting the two arms thereof, having a central aperture which fits about the pin 42, as shown in Fig. 2. A spring 49 is interposed between the web 48 of the link and the inner wall of the transverse web portion of the piston head. The two free ends of the arms of link 47 are secured to a cross pin 50 at the end of the rocker arm 33. A contact button 51 is carried by the rocker arm, said button being maintained in engagement with the wearpiece 41 of the piston by the action of spring 49, which yieldably urges the piston toward the arm 33.

From the aforegoing it may be seen that the openings in the piston head on each side the central transverse web portion thereof provide a passage together with the opening defined by the annular flange 43, which is controlled by the valve 44, said valve being operative to establish a free flow of fluid from the reservoir 27 through the piston passages mentioned into the compression chamber 60, formed in the cylinder 28 by piston 31, in response to the movement of the piston 31 toward the cover cap 30 of the shock absorber casing, this movement of the piston resulting by the movement of the spring 22 away from the frame 20 on its rebounding stroke.

The means for controlling the flow of fluid through piston passage 61 comprises a metering pin 65 slidable in the passage 61, the lower end of the metering pin fitting slidably into a recess 66 in the bottom end wall of cylinder 28, while the other end of the metering pin slidably extends through the opening 67 in the cap 30 of the casing into an enlarged recess 68 in said cap. A slot 70 is provided in the metering pin 65 and extends beyond the confines of the top and bottom of the piston when said piston is in normal position as shown in the Fig. 2. The ends of the slot are curved as at 71 so that as the piston moves toward one end or the other of said slot, the fluid flow therethrough is gradually diminished and restricted at either the upper or lower ends of the piston, dependent upon the movement thereof.

The upper end of the metering pin 65, extending into the recess 68, has a cap member 75 attached thereto, said cap member having the lower fold of a bellows 76 attached thereto in any suitable manner so as to form a hermetic seal at this point. The upper fold of said bellows is hermetically attached to a cover cap 77 which is provided with a nipple extension 78 to which a pipe 79 is adapted to be attached. Cover cap 78 is secured to the casing cover 30 by screws 80.

It will be understood that cylinder 29 is provided with a similar fluid flow controlling device for the passage 161 of the piston 32, this fluid flow controlling device being the metering pin 165. Metering pin 165 has a bellows 176 attached thereto in a manner similar to the attachment of bellows 76 to the metering pin 65. A pipe 179 is secured to the nipple 178 of cover cap 177 and communicates with the interior of the bellows 176.

The fluid supply device is designated by the numeral 180 and comprises a bellows, one end of which is hermetically attached to a bracket 81, which in turn is secured to a part of the vehicle body 82 in any suitable manner. The other end of the bellows is hermetically attached to a plate 83 which has a wearpiece 84 provided thereon. A nipple 85 on the bracket 81 communicates with the interior of the bellows 180 and provides for the attachment of a pipe 86 leading to the fluid pressure reservoir 87 to which the pipes 79 and 179 of the various shock absorbers are connected.

A collar 88 is secured to the vehicle body portion 82 in any suitable manner, this collar 88 rotatably supporting the actuator shaft 89, one end of which has an operating lever 90 provided thereon, the other end having the cam 91 attached thereto which operatively engages the wearpiece 84 of bellows 180. A pointer 92 on the lever or handle 90 cooperates with a dial 93 having the letters F—M—S appearing thereon which designate firm—medium—soft shock absorber characteristics.

The shock absorbers are connected in such a manner that when the springs 22 are moved on their compression stroke, due to the road wheels striking obstructions in the roadway, the link connection 36 will move the operating arm 35 of said shock absorbers so that the rocker arm 33 thereof will be moved counter-clockwise as regards Fig. 2. In this instance piston 32 will be drawn upwardly in its cylinder 29, thereby establishing a substantially free flow of fluid from the reservoir 27 past the intake valve of the piston into the compression chamber of cylinder 29. Under these circumstances piston 31 is being moved downwardly into the cylinder 28 by arm 33, having its wearpiece 51 engaging wearpiece 41 of the piston 31, pressure being exerted upon the fluid within the compression chamber 60. The escape of fluid from the compression chamber is through the channel 70 of the metering pin 65 to the reservoir, this fluid escape being restricted so that the piston movement downwardly is resisted, thereby resisting the compression movement of the vehicle spring. If the pressure in the compression chamber 60 is excessive, then a pressure release or pop-off valve 200, of any suitable design and including the well known spring-loaded valve, will establish a fluid leak from the compression chamber 60 through suitable passages between the cylinders in the casing back to the reservoir 27.

As shown in Fig. 2, normally, an equal portion of the slot 70 of the metering pins 65 or 165 is provided on opposite sides of the normally positioned pistons 31 or 32. Thus a fluid leak is provided around the piston to permit freer movements thereof within a certain range on each side of its normal center position.

If a greater restriction to the flow of fluid is desired within a shorter range from the central position of the piston, that is, if a stiffer ride is desired, then the handle 90 is moved counter-clockwise toward F or firm indication on dial 93, thereby causing shaft 89 to move its cam 91 away from the wearpiece 84 and thereby permitting the bellows 180 to expand, which diminishes the fluid pressure within the bollows 76 and 176 of the various shock absorbers. Springs 95 and 195 in the recesses 68 and 168 of said shock absorbers will move the metering pins 65 and 165 upwardly in this case, thereby moving the closed end of the slot 70 in the metering pins 65 and 165 into closer proximity to the bottom edge of the respective pistons 31 and 32 as they are in their normal position, and thus the by-pass of the fluid through the pistons is terminated with lesser movements of the pistons, that is, less travel of the piston downwardly will be then required to bring the slot 70 of the metering pin within the confines of the passage in the piston and thereby closing off the bypass.

On the other hand, to lengthen the time of by-passing said fluid through the metering pins 65 and 165, the handle 90 is moved toward the S or soft indication on dial 93, thus cam 91 engages wearpiece 84 to compress the bellows 180, delivering fluid under pressure through pipe 86, reservoir 87 to the various pipes 79 and 179 of the shock absorbers and then to the bellows 76 and 176 thereof, causing expansion of said bellows which moves the respective metering pins 65 and 165 downwardly in the shock absorbers and thus moving the ends of the slots 70 of said respective metering pins a greater distance from the lower edges of the respective pistons when in their normal position.

It will of course be understood that adjustments of the handle 90 to positions intermediate F and M and S and M will provide for varied positioning of the metering pins 65 and 165 within their respective shock absorbers.

In the present invention applicant has provided a simple and efficient device for controlling the movements of the frame and axles of a vehicle, which device is accessible from the seat of the driver of the vehicle to adjust the various shock absorbers to offer more or less resistance as the operator desires.

While the form of embodiment of the present invention as herein disclosed constitutes a preferred form, it is to be understood that other forms might be adopted, all coming within the scope of the claims which follow.

What is claimed is as follows:

1. A device for controlling the movements of a vehicle frame and axles comprising, in combination, a shock absorber providing a fluid reservoir and a cylinder; a piston in said cylinder forming a compression chamber therein, said piston having a passage for the transfer of fluid from the compression chamber to the reservoir; adjustable means supported in the shock absorber for controlling the flow of fluid through the piston passage in accordance with the position of the piston; hydraulically operated means attached to said adjustable means; and a manually operated member adapted to be operated to apply hydraulic pressure to said hydraulically operated means.

2. A device for controlling the movements of a vehicle frame and axles comprising, in combination, a shock absorber providing a fluid reservoir and a cylinder; a piston in said cylinder forming a compression chamber therein, said piston having a passage for the transfer of fluid from the compression chamber to the reservoir; a metering pin extending through said passage for controlling the flow of fluid therethrough in accordance with the position of the piston; and hydraulically operable means under the control of the vehicle operator, connected with the metering pin for adjusting said pin longitudinally relatively to the piston.

3. A device for controlling the movements of a vehicle frame and axles comprising, in combination, a shock absorber providing a fluid reservoir and a cylinder; a piston in said cylinder forming a compression chamber therein, said piston having a passage for the transfer of fluid from the compression chamber to the reservoir; a metering pin extending through said passage for controlling the flow of fluid therethrough in accordance with the position of the piston; hydraulically operable means connected to the metering pin for adjusting it longitudinally; means connected to the said means and adapted to deliver fluid under pressure thereto; and a hand operated member for operating said last mentioned means.

4. A device for controlling the movements of a vehicle frame and axles comprising in combination, a shock absorber providing a fluid reservoir and a cylinder; a piston in said cylinder forming a compression chamber therein, said piston having a passage for the transfer of fluid from the compression chamber to the reservoir; a metering pin extending through said passage for controlling the flow of fluid therethrough in accordance with the position of the piston a recess in the shock absorber, provided with a cover plate, the metering pin extending into said recess; an expansible container in said recess, one end being anchored to the cover plate, the other end to the metering pin; a fluid pressure device connected with said container; and a hand operated member for operating said fluid pressure device.

5. A device for controlling the movements of a vehicle frame and axles comprising, in combination, a shock absorber providing a fluid reservoir and a cylinder; a piston in said cylinder forming a compression chamber therein, said piston having a passage for the transfer of fluid from the compression chamber to the reservoir; a metering pin extending through said passage for controlling the flow of fluid therethrough in accordance with the position of the piston a recess in the shock absorber, into which one end of the metering pin extends, said recess having an apertured cap provided with a nipple for attaching a pipe; a bellows in said recess, one end being attached to the metering pin the other to the cap, said bellows being expansible by fluid pressure; a spring for contracting the bellows; means adapted to be operated to provide fluid pressure; a pipe connecting said means with the nipple on the cover cap which leads into the bellows; and a hand operated member for actuating the fluid pressure supply means.

6. A device for controlling the movement of the frame and axles of a vehicle comprising, in combination, a shock absorber providing a casing having a fluid reservoir and a cylinder; a piston in said cylinder, having fluid passages therein for the transfer of fluid from one side of the piston to the other, said piston forming a compression chamber in said cylinder; means providing for a substantially free flow of fluid through a piston passage in one direction only as the piston is moved in one direction; a metering pin for restricting the flow of fluid through another piston passage as the piston is moved in the opposite direction; a recess in the casing, containing a bellows one end of which is anchored against movement, the other being attached to the metering pin; a fluid pressure supply device adapted to be operated to deliver fluid under pressure to said bellows to operate it for adjusting the metering pin longitudinally in one direction relatively to the piston to vary the fluid restriction in accordance with the position of the piston in the cylinder; a spring for adjusting the metering pin in the other direction longitudinally; and a hand operated device for actuating the fluid pressure supply device.

7. A device for controlling the approaching and separating movements of the frame and axles of a vehicle comprising, in combination, shock absorbers connected between said frame and axles, each having a casing providing a fluid reservoir and two cylinders; a piston in each cylinder, each piston having a passage for the transfer of fluid from one side of the piston to the other; piston operating means; metering means in each piston passage to restrict the flow of fluid therethrough in accordance with the position of the piston in its respective cylinder; an expansible, hydraulically operable actuator connected with each metering means for adjusting it to vary the restriction to the flow of fluid through the respective piston passage; a fluid pressure supply device connected to the actuators of each shock absorber; and a hand operated member for operating the fluid pressure supply device.

8. A device for controlling the movements of the frame and axles of a vehicle comprising, in combination, a shock absorber providing a fluid reservoir and a cylinder; a piston in said cylinder forming a compression chamber therein, said piston having passages therein for the transfer of fluid from one side thereof to the other; means for establishing a free flow of fluid through one piston passage in one direction only; metering means for restricting the flow of fluid through the other piston passage in accordance with the position of the piston in the cylinder; a hydraulically operated actuator connected to said metering means; and a hand operated fluid pressure device connected to said actuator and accessible from the seat of the vehicle operator for providing fluid to move the actuator for adjusting said metering means relatively to the piston.

9. A device for controlling the movements of a vehicle frame and axle comprising, in combination, a shock absorber having a fluid reservoir and cylinder; a piston in said cylinder forming a compression chamber therein; means providing a by-pass in the piston for the fluid from the compression chamber into the fluid reservoir as the piston is moved in one direction; a fluid metering device for said by-pass; hydraulically operated means adapted to adjust said fluid metering device; and a manually operated fluid pressure pump connected to said hydraulically operated means.

10. A device for controlling the movements of a vehicle frame and axle comprising, in combination, a shock absorber having a fluid reservoir and cylinder; a piston in said cylinder forming a compression chamber therein; means adapted to establish a variably restricted flow of fluid from the compression chamber in accordance with the positions of the piston as it is moved in one direction; a hydraulically operable actuator connected to said means; a manually operable fluid pressure pump accessible from the seat of the vehicle operator; and a hydraulic connection between the said pump and actuator whereby said means may be adjusted manually to vary its restriction upon the fluid flow.

11. A device for controlling the movements of a vehicle frame and axle comprising, in combination, a shock absorber having a fluid reservoir and cylinder; a piston in said cylinder forming a compression chamber therein; a fluid flow control device comprising a stationary metering pin cooperating with the piston to establish a restricted flow of fluid from the compression chamber through the piston in response to the movement and in accordance with the positions of the piston in one direction; a collapsible container attached to said fluid flow control device; a bellows containing a fluid; a pipe connecting the container and bellows; and a manually operable camming member engaging the bellows and accessible from the driver's seat in the vehicle, and adapted, when operated, to actuate the bellows to provide fluid pressure for moving the container whereby the metering pin of the fluid flow control device is adjusted to vary the restriction to the flow of fluid through the piston.

In testimony whereof I hereto affix my signature.

GUY E. PARKER.